United States Patent [19]
Pietras

[11] Patent Number: 5,157,954
[45] Date of Patent: Oct. 27, 1992

[54] ANTI-THEFT DEVICE FOR BICYCLES

[76] Inventor: Robert T. Pietras, 5540 Owensmouth Ave., #212, Woodland Hills, Calif. 91367

[21] Appl. No.: 755,693

[22] Filed: Sep. 6, 1991

[51] Int. Cl.⁵ .............................................. B62H 5/16
[52] U.S. Cl. .............................. 70/227; 70/DIG. 57; 70/233
[58] Field of Search .................. 70/14, 18, 19, 233, 70/225-227, 57-58, DIG. 57

[56] References Cited

U.S. PATENT DOCUMENTS

| | | | |
|---|---|---|---|
| 1,218,540 | 3/1917 | Fell | 70/226 |
| 1,288,606 | 12/1918 | Jensen | 70/DIG. 57 |
| 1,402,725 | 1/1922 | Pippen | 70/227 |
| 2,366,863 | 1/1945 | Lippow | 70/227 |
| 2,706,901 | 4/1955 | Jenkins | 70/227 |
| 3,800,570 | 4/1974 | Kaplan | 70/18 |
| 4,257,248 | 3/1981 | Williams | 70/227 |
| 4,290,284 | 9/1981 | Nicksic | 70/227 |
| 4,861,079 | 8/1989 | DeForrest, Sr. | 70/DIG. 57 |
| 5,069,049 | 12/1991 | Shieh | 70/227 |

FOREIGN PATENT DOCUMENTS 823839 7/1937 France .................................. 70/233

Primary Examiner—Renee S. Luebke
Assistant Examiner—D. Boucher

[57] ABSTRACT

A bicycle anti-theft device which may be permanently attached to a bicycle frame, and provides structure to support a locking mechanism which traverses the spokes of a wheel. The mounting assembly (10) supports and secures two elongated flat arms (16R) and (16L) to the center vertical tube of a bicycle frame. The two arms are slidably mounted in notched casing, (14R) and (14L) which are each fastened to a corresponding half of a mounting clamp (12R) and (12L). The mounting clamp halves are secured to the bicycle frame utilizing threaded fasteners (22). The right elongated arm (16R) possesses a through hole (44) which allows or denies access to these mounting fasteners in the unlocked and locked positions, respectively. The two elongated arms also possess holes (42) which support a padlock (18) between adjacent spokes of a wheel to prevent its rotation and holes (48) to support the padlock away from the wheel during vehicle operation.

6 Claims, 3 Drawing Sheets

ANTI-THEFT DEVICE FOR BICYCLES

BACKGROUND OF THE INVENTION

1. Field of the Invention

This invention relates to bicycle locks, specifically to such locks which are mounted to a bicycle frame and provide a means to extend through the spokes of a wheel thus preventing its rotation.

2. Description of Prior Art

In an effort to promote ease of use and convenience in a bicycle lock, several inventions have been generated for devices which are permanently, or semi-permanently attached to the bicycle frame. These devices generally include a pivotally mounted member which swings between the spokes of a wheel thereby preventing rotation of the wheel in the locked position.

While most of these inventions offer convenience and ease of use, the actual security they provide is marginal. The majority of these devices are inadequate for the following two reasons:

(a) The threaded fasteners which secure the locks to the bicycle frame are often exposed in the locked position and are prone to easy removal.

(b) The devices utilize bicycle frame attachment hardware that is structurally deficient and vulnerable to prying and forced debilitation or removal.

From a review of these inventions, it seems that much of the design effort has gone into the actual locking mechanisms while the bicycle frame mounting methods have been neglected. U.S. Pat. No. 2,691,289 to Wollaston (1950) shows a rod pivotally mounted to the bicycle frame adjacent to the rear wheel. The device description clearly indicates that the mounting fasteners are exposed in the locked position. It is evident that the locking device itself could easily be removed with an allen wrench or similar tool. Wollaston states that a specially sized allen wrench could be utilized to attach the lock. This solution is not ideal, as the tool would have to be supplied with the lock and retained in order to make mounting adjustments or transfer the lock to another bicycle. In addition, since the mounting screws are exposed, a would-be thief might easily find a suitably sized object to remove them and thus the lock.

Wollaston's device also appears vulnerable to prying and forced debilitation. The intricate locking mechanism is encased in a small housing and would not withstand a significant torque or shear force. A moderate force applied at the free end of the pivotally mounted locking bar would be sufficient to bend or shear off the anti-rotation pins of the locking mechanism.

U.S. Pat. No. 2,604,774 to McFall (1949) discloses a solution to this problem. A clamp with a socket is attached to a bicycle frame member on the opposite side of the wheel from the locking mechanism. The pivotally and slidably mounted locking bar has a tongue which extends through this socket in the locked position. This arrangement would prevent the application of a significant torque to the locking bar by securing its free end. McFall realized that a debilitating torque could readily be applied to the locking bar and devised this solution. However, the nuts which secure the socketed clamp to the bicycle frame are easily accessible and readily removed. Once this has been accomplished, the lock may be quickly rendered ineffective.

The problem of accessible and thus removable mounting fasteners is addressed by the device described in U.S. Pat. No. 2,480,481 to Kelly (1946). In this design the screw heads are encased in the lock housing preventing their removal. However, the mounting clamp is oriented in such a way as to facilitate rotation of the entire mechanism about the bicycle frame member to which it is attached. The frictional force of the clamp could easily be overcome and the lock rotated thus moving the slidable locking bar out from between the spokes.

Another disadvantage of Kelly's device is the potential safety hazard produced by the slidable locking bar. In the riding or unlocked position, the bar protrudes a significant distance from the bicycle frame in a perpendicular direction. The protruding bar could easily become entangled or strike a stationary object as the rider passed by, resulting in an accident. In addition, the protruding bar poses a severe injury risk to a rider in the event of any accident.

All of the permanently attached, spoke traversing bicycle locks heretofore known lack a significant amount of security. All are vulnerable to prying, torquing, and other types of forced debilitation. They are also susceptible to relatively easy removal due to weak or exposed bicycle frame mounting arrangements. In addition, most of these devices and all three mentioned previously suffer from the following disadvantages:

(a) Their manufacture requires the assembly of a relatively large number of components into confined housings. This increases costs due to the necessary tight machining tolerances and assembly time. In addition, the devices are not rugged due to the down-sizing of components required for space minimization.

(b) The devices are mounted in close proximity to the spokes of the bicycle wheel. The potential of the lock mountings to become loose during vehicle operation is very high due to the vibrational environment. If one of these devices became entangled in the spokes while riding, a serious accident and/or injury could occur.

(c) The large number of moving parts and close assembly fits contained in these locks pose a reliability problem. The operational environment including intrusion of dirt and exposure to the elements could easily jam one of these mechanisms rendering the device inoperative.

Accordingly, several objects and advantages of my invention are:

(a) to provide an anti-theft device which may be permanently attached to a bicycle frame and in conjunction with a standard padlock, creates a high security spoke traversing bicycle lock; this invention offers added convenience by eliminating the need to carry and manipulate a cumbersome peripheral bicycle lock;

(b) to provide a bicycle anti-theft device which is easily mounted on a bicycle frame using a single standard tool;

(c) to provide a bicycle anti-theft device with a mounting arrangement that absolutely prevents access to the mounting fasteners in the locked position thereby preventing removal by an unauthorized individual;

(d) to provide a bicycle anti-theft device which is of rugged construction impervious to prying and all types of forced debilitation;

(e) to provide a bicycle anti-theft device which is of simple design with minimal moving parts thus reducing cost and increasing reliability; and (f) to provide a bicycle anti-theft device which is mounted in such a way as to prevent all possibility of spoke interference during vehicle operation.

Further objects and advantages of my invention are to provide a bicycle anti-theft device which completely encompasses the adjacent wheel section when locked (a security advantage that the majority of prior spoke traversing locks lack), which is simple to use and inexpensive to manufacture, which is easily adjustable and transferrable to any number of bicycles if desired, and which is compatible with a wide variety of bicycles. Still further objects and advantages will become apparent from a consideration of the ensuing description and drawings.

DESCRIPTION OF THE PREFERRED EMBODIMENT

Figure 1:
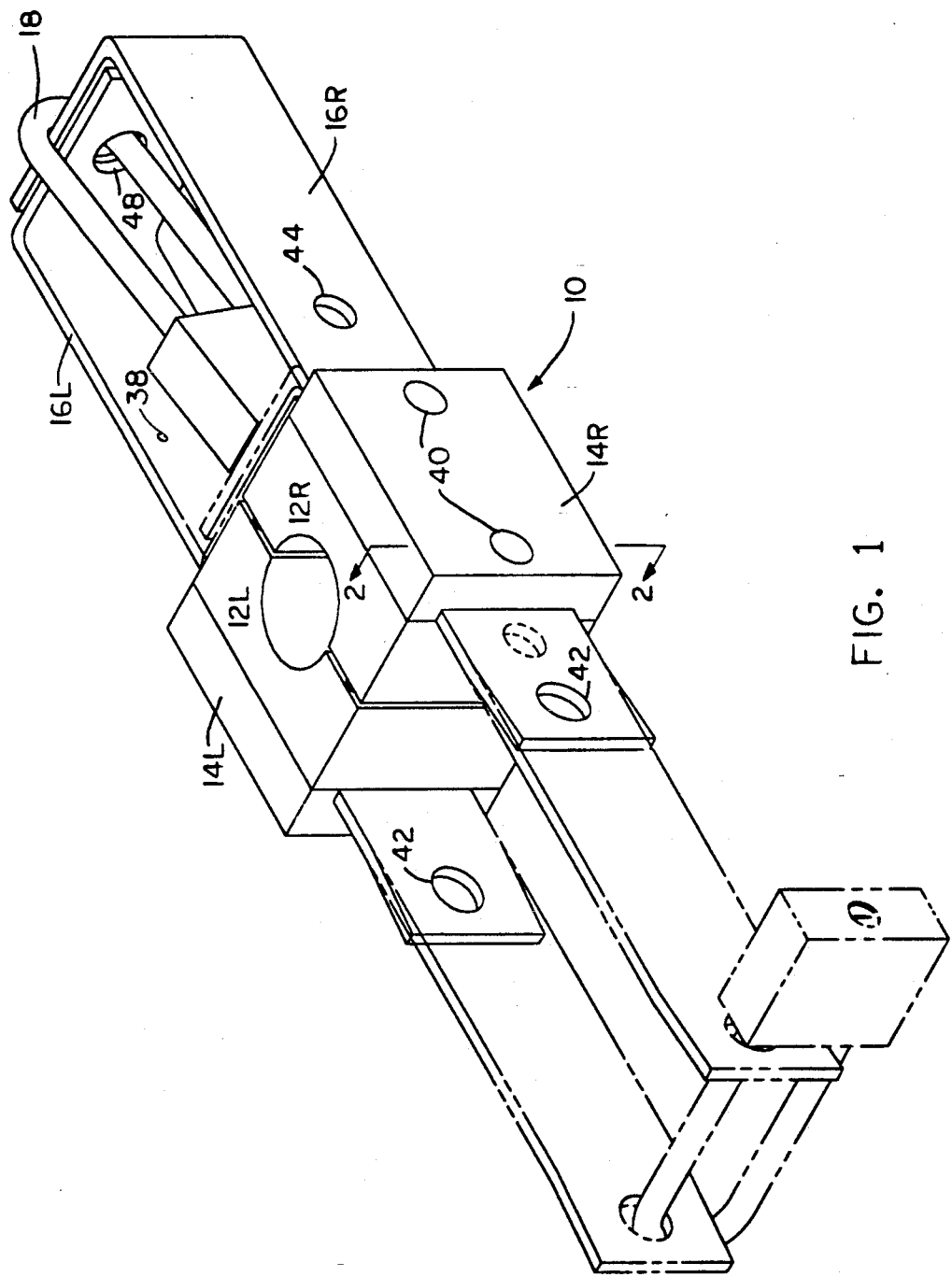
FIG. 1 is a perspective view showing my invention in the fully assembled state utilizing a standard long shackle padlock.
Figure 4:
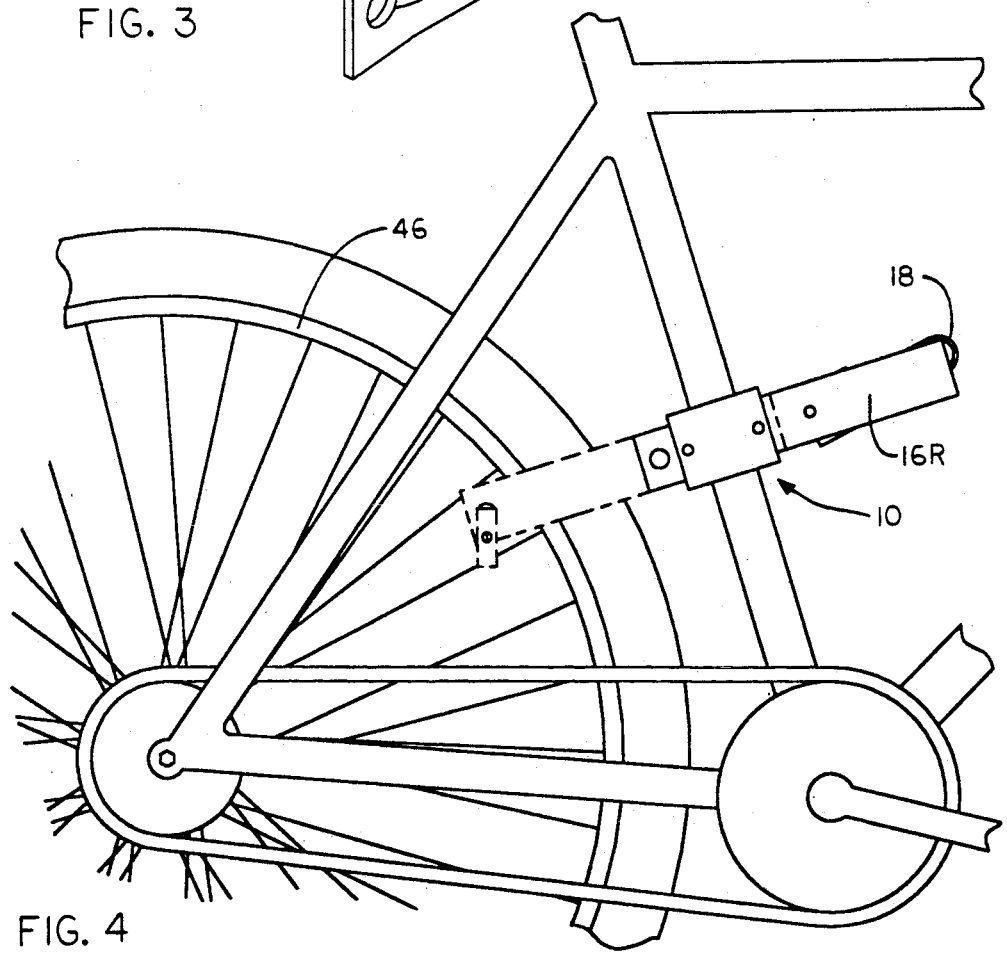
FIG. 4 is a side view showing the most common mounting location and relationship of the invention to a bicycle.

FIG. 1 depicts the fully assembled state of my invention. Two padlock support arms 16R and 16L are conveniently in the form of flat elongated metal bars which are slidably secured in a mounting assembly 10. The mounting assembly is a box-shaped aluminum structure comprised of four sections which are joined together utilizing threaded fasteners. Right and left mounting clamps 12R and 12L each have semi-circular sections of material removed from their facing sides which form a circular enclosure when joined to grasp the center vertical tube of a bicycle frame. FIG. 4 shows this mounting location. The radius of these two semi-circular cut-outs corresponds to a frame center tube radius which has been found to be common to a wide variety of bicycles.

Figure 2:
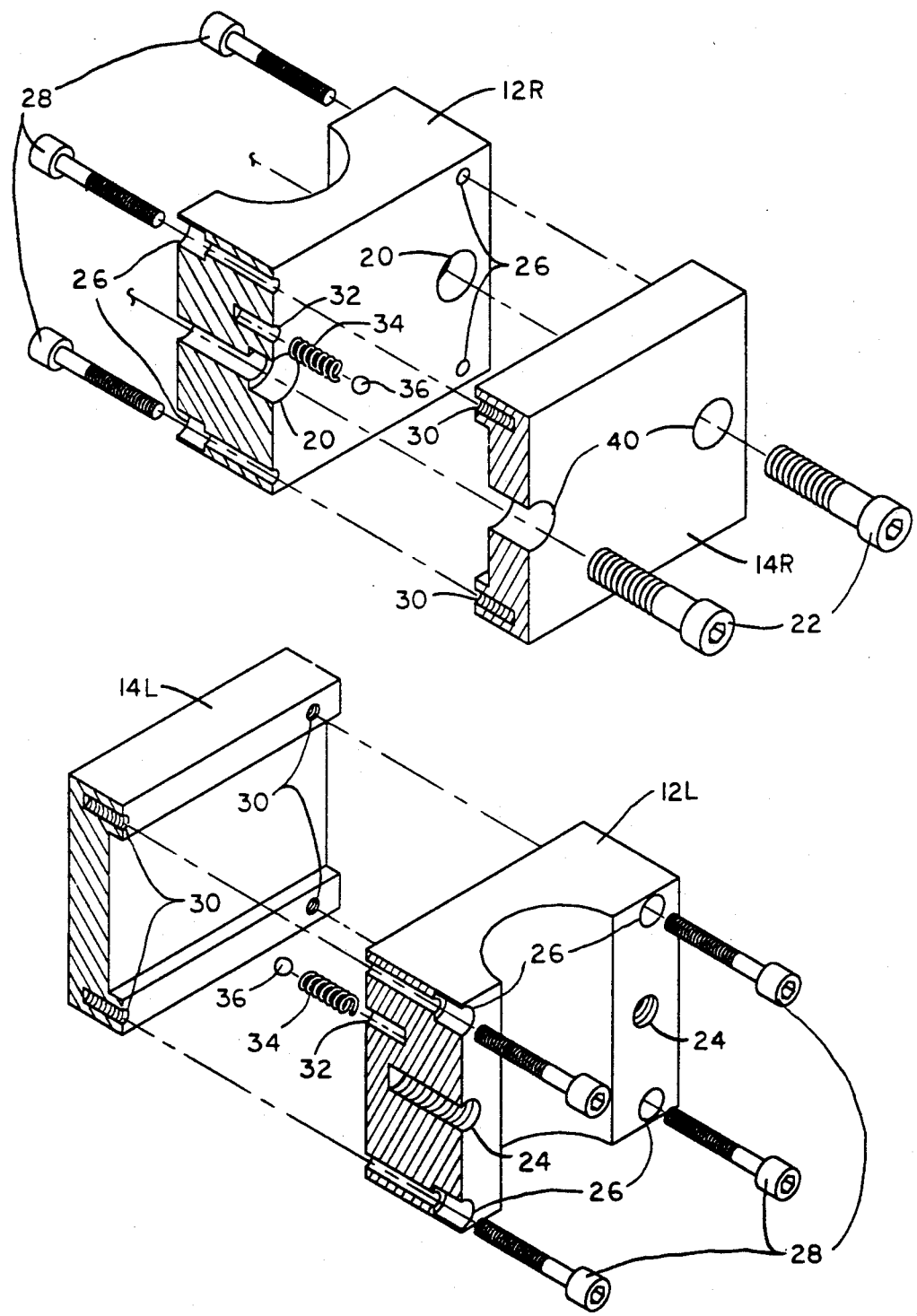
FIG. 2 is an exploded view indicated by the section lines 2—2 showing the mounting clamp assembly with the padlock support arms removed for clarity.

The relationship of the mounting assembly components is best shown by FIG. 2. Mounting clamp 12R has two counter-bored through holes 20 which hold two mounting fasteners 22, while Mounting clamp 12L has two corresponding tapped holes 24 which accept the mounting fasteners thus producing the clamping arrangement. Mounting clamp halves 12R and 12L also possess four smaller counter-bored through holes 26 which hold assembly fasteners 28. Each hole 26 is aligned with a corresponding tapped hole 30 in right and left padlock support arm casings 14R and 14L. This arrangement secures casings 14R and 14L to clamps 12R and 12L, respectively.

Clamps 12R and 12L each contain a blind hole 32. These holes each accept a compression spring 34 and a steel bearing ball 36. Each bearing ball is aligned with a corresponding dimple 38 which is machined into arm 16R and arm 16L. This arrangement serves as a detent which prevents arms 16R and 16L from moving during vehicle operation.

In addition to four tapped holes 30, right padlock support arm casing 14R contains two through holes 40 which allow fasteners 22 to pass through to right mounting clamp 12R when attaching the device to a bicycle. Each arm casing 14R and 14L also has a rectangular channel cut through the side which faces its corresponding mounting clamp half 12R and 12L. When fully assembled, these channels serve as the slot through which arms 16R and 16L slide.

Figure 3:
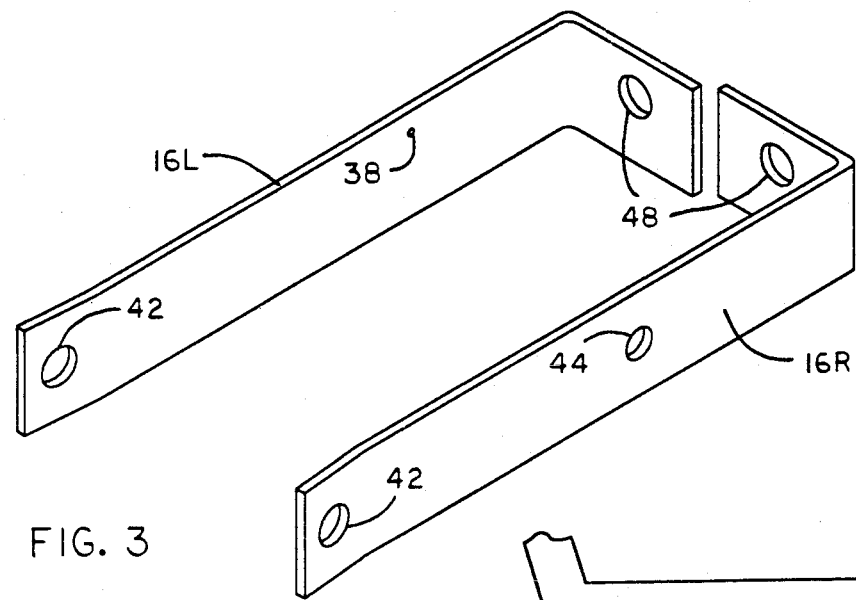
FIG. 3 is a perspective view showing the slidable padlock support arms.

Padlock support arms 16R and 16L are best shown in FIG. 3. Each is conveniently in the form of a flat elongated metal bar. Each has a perpendicular bend at the end opposite the rear bicycle wheel with a through hole 48 which serves to support a padlock 18 during vehicle operation. Each contains a dimple 38 which is aligned with a corresponding steel bearing ball 36 upon assembly to serve as a detent as mentioned previously. Each arm is slightly flared at the end adjacent to the rear bicycle wheel to prevent accidental removal of the arms from mounting assembly 10 while on the bicycle. Each arm also has a through hole 42 in its flared end which accepts the padlock shackle thus producing the wheel locking arrangement. Arm 16R contains an additional through hole 44 which is positioned so that it may be slid into alignment with holes 20 and 40 to attach mounting fasteners 22.

Prior to mounting my invention to a bicycle frame, the two halves of the device would be fully assembled. For the right half, this involves inserting a compression spring 34 and bearing ball 36 into hole 32, placing arm 16R into its corresponding slot in casing 14R, and securing this casing to clamp 12R utilizing four assembly fasteners 28. An identical operation would be performed to assemble the left half of the device.

Once the two halves have been assembled, the device may be attached to the center vertical tube of the bicycle frame as shown in FIG. 4. The first step in this procedure is to slide arm 16R in its casing until hole 44 is aligned with one of two through holes 40 in casing 14R. When this has been accomplished, one of two mounting fasteners 22 may be inserted until it seats in its corresponding hole 20 in right mounting clamp 12R.

The left half of the anti-theft device may now be aligned with the right half so that the two semi-circular cut-outs form a circular enclosure around the center vertical tube of the bicycle frame and fastener 22 engages with the threads of its corresponding tapped hole 24 in left mounting clamp 12L. This fastener is then torqued to apply the clamping force. Using the same procedure described in the preceding paragraph, a second mounting fastener 22 may be inserted in its respective counter-bored hole 20, engaged with its corresponding tapped hole 24 threads, and torqued to provide a symmetrical clamping force. The device is now permanently attached to the bicycle frame to be removed only at the owner's discretion.

From the previous two paragraphs it is clear that mounting fasteners 22 are absolutely inaccessible unless hole 44 in arm 16R is aligned with either hole 40. In subsequent paragraphs it will become clear that movement of the support arms will be extremely limited and that hole 44 is positioned such that it may never be aligned with either hole 40 in the locked position. It is this arrangement which absolutely prohibits expeditious removal of the anti-theft device by an unauthorized individual.

Once attached to the bicycle frame, the device may be utilized to lock the rear wheel. The locked position is illustrated by the phantom lines in FIGS. 1 and 4. This position is achieved by sliding arms 16R and 16L toward the rear wheel until holes 42 have been extended past wheel rim 46. The padlock shackle is then inserted through both arms 16R and 16L and locked. The padlock shackle intersects the plane of spoke rotation creating interference with the spokes thus preventing wheel rotation. In addition, movement of the padlock support arms in the locked position is restricted by impingement of the padlock shackle on wheel rim 46. Thus hole 44 in arm 16R may not be aligned with either hole 40 making fasteners 22 inaccessible as mentioned previously.

The position of the device during vehicle operation is shown by the solid lines in FIGS. 1 and 4. This position is achieved first by unlocking padlock 18 and removing it from arms 16R and 16L. The two arms are then slid toward the front wheel of the bicycle until the two detents are engaged. Detent engagement can be felt and also produces an audible click. As mentioned previously, each detent is comprised of a compression spring 34, bearing ball 36 and dimple 38 on each padlock support arm. This arrangement prevents movement of the arms during vehicle operation. In addition, since arms 16R and 16L are aligned parallel to the plane of spoke rotation, they do not actually make contact with the wheel or spokes at any position along their travel. Therefore, even if the arms were accidentally slid toward their locked position during vehicle operation, no wheel or spoke interference would result.

Once arms 16R and 16L have been secured in the riding position by the detents, padlock 18 is aligned parallel to the arms and the shackle inserted through holes 48 in the perpendicularly bent arm portions. The padlock is then closed and rotated such that it comes to rest between the two arms. This position is best shown by the solid lines in FIG. 1. Holes 48 are positioned such that the shackle rests on both the lower hole edges and on the top edges of the perpendicularly bent portions of arms 16R and 16L. This arrangement supports the padlock between the two arms and restricts its movement during vehicle operation.

Mounting adjustment, removal, or transference of the device to another bicycle is performed by simply aligning hole 44 in arm 16R with holes 40. This exposes mounting fasteners 22 which may then be removed or adjusted using a single standard allen wrench.

Thus the reader will see that the bicycle anti-theft device of this invention offers high security and convenience, is easy to attach, nd is simple to use. Furthermore, this device offers the following advantages over other permanently attached, spoke traversing bicycle locks:

it may be mounted to a bicycle frame using a single standard tool and is fully transferable to another bicycle if desired;

the mounting fasteners are completely inaccessible in the locked position, preventing unauthorized removal;

it is of rugged construction, impervious to prying and forced removal;

it is of simple design, making it inexpensive to manufacture and highly reliable; and it poses no threat of wheel or spoke interference during vehicle operation.

While the above description contains many specificities, these should not be construed as limitations on the scope of the invention, but rather as an exemplification of one preferred embodiment thereof. For example, a high strength plastic could be utilized to fabricate the mounting assembly, possibly facilitating injection molding and/or reducing machining costs; the two padlock support arms can have other shapes; the padlock can be replaced by a bar arrangement or assembly which serves the same function; the ball and spring detents can be eliminated or replaced by a different feature which serves the same function, etc.

Thus the scope of the invention should be determined by the appended claims and their legal equivalents, rather than by the examples given.

I claim:

1. A bicycle anti theft device, comprising:
    (a) a mounting clamp,
    (b) means for fastening said mounting clamp to a bicycle frame,
    (c) two elongated arms,
    (d) two casings for securing said arms to said mounting clamp, said arms being slidably mounted in said casings,
    (e) means for fastening said casings to said mounting clamp,
    (f) a means for bridging the gap between said arms, said bridging means possessing a mechanism for locking to said elongated arms, and said bridging means being of suitable size to traverse adjacent spokes of a wheel,
    (g) each of said elongated arms possessing a through hole for supporting said bridging means between adjacent spokes of said wheel.
    (h) said elongated arms possessing a means for supporting said bridging means a substantial distance away from said wheel to prevent interference during vehicle operation.
    (i) one of said elongated arms possessing a through hole which is positioned so as to allow or disallow access to said bicycle frame fastening means.

2. The device of claim 1 wherein said bridging means is a padlock.

3. The device of claim 1, further including a detent means for passively securing said elongated arms against movement during bicycle operation.

4. The device of claim 2 wherein said bridging means support means is comprised of perpendicularly bent portions of said elongated arms possessing through holes which are positioned to accept the shackle of said padlock and support said padlock between said elongated arms.

5. The device of claim 2, further including a detent means for passively securing said elongated arms against movement during bicycle operation.

6. The device of claim 4, further including a detent means for passively securing said elongated arms against movement during bicycle operation.

* * * * *